US008452628B2

(12) United States Patent
Ouimet (10) Patent No.: US 8,452,628 B2
(45) Date of Patent: May 28, 2013

(54) SYSTEM AND METHOD OF FACILITATING INTERACTION BETWEEN MEMBERS OF SUPPLY CHAIN (75) Inventor: Kenneth J. Ouimet, Scottsdale, AZ (US)

(73) Assignee: SAP AG, Walldorf (DE)

( * ) Notice: Subject to any disclaimer, the term of this patent is extended or adjusted under 35 U.S.C. 154(b) by 420 days.

(21) Appl. No.: 11/869,875

(22) Filed: Oct. 10, 2007

(65) Prior Publication Data

US 2009/0099879 A1  Apr. 16, 2009

(51) Int. Cl.
*G06Q 90/00* (2006.01)
(52) U.S. Cl.
USPC .......................... 705/7.12; 705/7.26
(58) Field of Classification Search
USPC ............................................................ 705/7
See application file for complete search history.

(56) References Cited

U.S. PATENT DOCUMENTS

| | | | |
|---|---|---|---|
| 5,862,325 A | 1/1999 | Reed et al. | |
| 5,953,707 A * | 9/1999 | Huang et al. | 705/7.25 |
| 6,609,101 B1 * | 8/2003 | Landvater | 705/7.25 |
| 7,761,324 B2 * | 7/2010 | Amerasinghe et al. | 705/10 |
| 2002/0065696 A1 * | 5/2002 | Hack et al. | 705/7 |
| 2002/0169657 A1 * | 11/2002 | Singh et al. | 705/10 |
| 2003/0055710 A1 * | 3/2003 | Burk et al. | 705/10 |
| 2004/0064351 A1 * | 4/2004 | Mikurak | 705/7 |
| 2004/0236639 A1 * | 11/2004 | Candadai et al. | 705/27 |
| 2005/0044274 A1 * | 2/2005 | Deming et al. | 709/246 |
| 2007/0208608 A1 * | 9/2007 | Amerasinghe et al. | 705/10 |

OTHER PUBLICATIONS

Lu, R.; et al.; Modeling customized product configuration in large assembly manufacturing with supply-chain considerations; Springer Science+Business Media, LLC; Int J Flex Manuf Syst (2007) 19:685-712.*

* cited by examiner

*Primary Examiner* — Susanna M Meinecke Diaz
*Assistant Examiner* — Ashley Chou
(74) *Attorney, Agent, or Firm* — Buckley, Maschoff & Talwalkar LLC (57) ABSTRACT A computer-implemented method involves facilitating interaction between members of a supply chain. A communication platform links to a plurality of hubs for electronic data transfer. The hubs are associated with the members of the supply chain. The method provides a standardized model for product decisions for each member of the supply chain. The method involves formulating a product plan by a first member of the supply chain. The product plan utilizes the standardized model and data available to the first member to generate a forecast under the product plan. The method transfers the product plan with shared data and forecast through a first hub associated with the first member and through the communication platform to a second hub associated with a second member of the supply chain. The communication platform controls the transfer of data so that the second member can evaluate the product plan and forecast under the standardized model.

38 Claims, 2 Drawing Sheets

SYSTEM AND METHOD OF FACILITATING INTERACTION BETWEEN MEMBERS OF SUPPLY CHAIN

CROSS-REFERENCE TO RELATED PATENT APPLICATIONS

The present patent application is related to copending U.S. patent application Ser. No. 11/869,909, entitled "System and Method of Providing Data Subscription Services for Searchable Data Sources", and filed concurrently herewith by Kenneth J. Ouimet.

FIELD OF THE INVENTION

The present invention relates in general to statistical modeling and, more particularly, to a supply chain communication platform for exchange of data which is used in standardized models to enhance communication between retailers and suppliers.

BACKGROUND OF THE INVENTION

Retail stores are in business to sell merchandise and make a profit. Store managers are most concerned with product-related marketing and decisions such as product placement, assortment, space, price, promotion, and inventory. If the products are non-optimized in terms of these product decisions, then sales can be lost and profit will be less than what would otherwise be possible in an optimal system. For example, if the product assortment, space, or inventory is not properly selected or maintained, then the consumer is less likely to buy these products. If price is too high or too low, then profit can be lost. If promotions are not properly targeted, then marketing efforts will be wasted. If the product placement is poorly laid-out, then the store loses sales.

In a similar manner, suppliers (manufacturers and distributors) who supply to retail stores are in business to sell merchandise and make a profit. Suppliers are concerned with manufacturing, inventory, price, promotions, transportation, delivery schedules, returns, and seasonal merchandise. Yet, both retailers and suppliers share common concerns as they are inherently connected by supply chain logistics and economics. Problems at one end of the supply chain can adversely affect the profitability of another part of the supply chain. For example, if the supplier has not properly planned for inventory requirements for a promotional item, then the product may not be available to meet the retail demand or the supplier may be left with excess inventory at the end of the promotion. If the products sold by the suppliers are non-optimized in terms of their product decisions, then sales may be lost and profit will be less than what would otherwise be possible in an optimal system.

In order to maximize the outcome of product-related decisions, retail store and supplier management have used statistical modeling and strategic planning to optimize the decision making process for many product decisions. Economic modeling and planning is commonly used to estimate or predict the performance and outcome of real systems, given specific sets of input data of interest. A model is a mathematical expression or representation which predicts the outcome or behavior of the system under a variety of conditions. An economic-based system will have many variables and influences which determine its behavior. In one sense, it is relatively easy to review historical data, understand its past performance, and state with relative certainty that the system's past behavior was indeed driven by the historical data. A much more difficult task, but one that is extremely important and valuable, is to generate a mathematical model of the system, which predicts how the system will behave, or would have behaved, with different sets of data and assumptions. The field of probability and statistics has provided many tools, which allow predictions to be made with reasonable certainty and acceptable levels of confidence.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve an accurate correlation of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One emerging area in which modeling has exceptional promise is in the retail sales and supplier environments. Grocery stores, general merchandise stores, specialty shops, and other retail outlets face stiff competition for limited customers and business. Suppliers must manage the supply chain to service the retailers. Retailers and suppliers alike make every effort to maximize sales, volume, revenue, and profit. Economic modeling can be an effective tool in helping retail storeowners and suppliers achieve these important goals.

Retailers and suppliers have traditionally used a variety of modeling tools to represent and optimize one or more of the product decisions described above, i.e., product placement, assortment, space, price, promotion, inventory, delivery, and seasonal merchandise. One modeling tool may optimize for product placement, assortment, and space. Another modeling tool will optimize inventory. Yet another modeling tool may optimize for price. Still another modeling tool will predict optimal manufacturing schedules. Each modeling tool may yield good results for the specific criteria being considered.

Retailers and suppliers each generate and track different data and utilize different models customized to their business for planning purposes. The cost of creating and executing the different models reduces the overall profitability for both parties. Moreover, getting suppliers and retailers to share information is no small feat. Suppliers and retailers are cautious to the idea of sharing data because of competitive concerns. The data may be only partially disclosed or tightly restricted as to its dissemination and use. Even when shared, the data is not necessarily compatible with the recipient's model. The recipient may not be able to make any meaningful judgments from the limited shared data. In addition, the output of these models do not necessarily correlate, which inhibits the supply chain members from reaching any mutually beneficial or optimal supply chain management and product decisions. For example, the supplier may, with its data and models, forecast a given demand for a product based on a given price and promotion. The retailer could run the same product pricing and promotion and get a different demand forecast based on its data and models. With the present supply chain system that tends toward isolation of data and individualized modeling tools, suppliers and retailers are often disjointed in making important product decisions.

A need exists to improve the performance of supply chain logistics and economics for both suppliers and retailers.

SUMMARY OF THE INVENTION

In one embodiment, the present invention is a computer-implemented method of facilitating interaction between members of a supply chain comprising the steps of providing a communication platform, linking a plurality of hubs to the communication platform for electronic data transfer, the hubs being associated with the members of the supply chain, providing a standardized model for product decisions for each member of the supply chain, formulating a product plan by a first member of the supply chain, the product plan utilizing the standardized model and data available to the first member to generate a forecast under the product plan, and transferring the product plan with shared data and forecast through a first hub associated with the first member and through the communication platform to a second hub associated with a second member of the supply chain. The communication platform controls transfer of data so that the second member can evaluate the product plan and forecast formulated by the first member under the standardized model.

In another embodiment, the present invention is a computer-implemented method of facilitating communication between members of a supply chain comprising the steps of providing a communication platform, linking a plurality of hubs to the communication platform for electronic data transfer, the hubs being associated with the members of the supply chain, formulating a product plan and forecast by a first member of the supply chain, and transferring the product plan and forecast through a first hub associated with the first member and through the communication platform to a second hub associated with a second member of the supply chain.

In another embodiment, the present invention is a computer program product usable with a programmable computer processor comprising computer readable program code which provides a communication platform, links a plurality of hubs to the communication platform for electronic data transfer, the hubs being associated with the members of the supply chain, formulates a product plan by a first member of the supply chain, and transfers the product plan and forecast through a first hub associated with the first member and through the communication platform to a second hub associated with a second member of the supply chain.

In another embodiment, the present invention is a computer system for facilitating communication between members of a supply chain comprising means for providing a communication platform, means for linking a plurality of hubs to the communication platform for electronic data transfer, the hubs being associated with the members of the supply chain, means for formulating a product plan by a first member of the supply chain, and means for transferring the product plan and forecast through a first hub associated with the first member and through the communication platform to a second hub associated with a second member of the supply chain.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents, as supported by the following disclosure and drawings.

Figure 1:
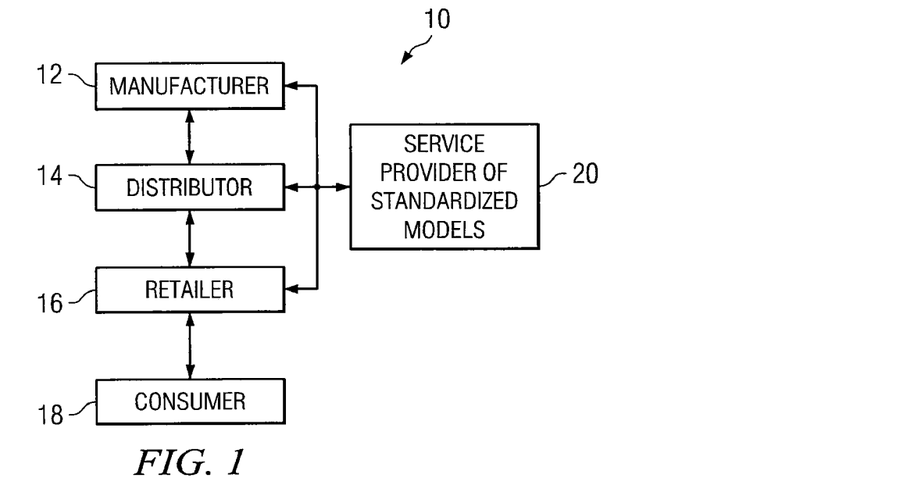
FIG. 1 is a block diagram of a supply chain interacting with a service provider of standardized models.

Referring to FIG. 1, in supply chain process 10, manufacturer 12 produces certain product lines or services. The concept of manufacturer 12 can be extended to include the suppliers of raw materials to the product manufacturer, e.g., the farmer providing fresh vegetables to the manufacturer of frozen dinners. Distributor 14 buys from manufacturer 12 and sells to retail store (retailer) 16. Distributor 14 includes all levels of supply chain participants residing between the manufacturer and retailer who are involved in distribution and delivery of products. Manufacturer 12 and distributor 14 can each be viewed as a supplier depending on the frame of reference. Retailer 16 offers the product lines or services as available for sale to consumers 18. The terms products and services are used interchangeably in the present discussion. Retailer 16 may be a food store chain, general products retailer, drug store, clothing store, discount warehouse, department store, specialty store, etc. A store may be a single location, or a chain or logical group of stores.

Manufacturer 12, distributor 14, retailer 16, and consumer 18 are members of supply chain 10. Each member of the supply chain is inherently connected to the other members. The profitability of one member of the supply chain necessarily affects the profitability of the other members. Each member of the supply chain desires to optimize supply chain management and logistics through product decisions in order to maximize sales, revenue, profitability, service, and value between each member of the supply chain.

Each member of the supply chain controls its respective product decisions. For example, manufacturer 12 controls manufacturing, promotions, delivery, and pricing of its products. Distributor 14 controls inventory, delivery, and pricing of its products. Retailer 16 has the ability to set pricing, order inventory, run promotions, arrange its product displays, collect and maintain historical sales data, and adjust its strategic business plan. Consumer 18 makes buying decisions based on quality, price, promotion, service, and value. The management teams of each supply chain member are held accountable for market share, profits, and overall success and growth of the business. The economic modeling tools and data processing system described herein are applicable to other enterprises and businesses having similar goals, constraints, and needs.

Manufacturer 12, distributor 14, and retailer 16 each have a business or operational plan. The business plan includes many planning, analyzing, and decision-making steps and operations. The business plan allows the management team to evaluate performance and trends, make strategic decisions, set pricing, alter manufacturing schedules, purchase equipment, order inventory, formulate and run promotions, hire employees, expand stores, add and remove product lines, organize product shelving and displays, select signage, and the like. The business plan provides the ability to analyze data, evaluate alternatives, run forecasts, and make operational decisions. The management team can change the business plan as necessary.

As one important tool for successful execution on its business plan, the management team needs accurate economic models. Economic and financial modeling has many uses and applications; it is an important business tool, which allows companies to conduct business planning, forecast demand, manage supply chains, order equipment, control inventory, manage manufacturing, predict revenue, and optimize price and profit. Economic modeling is an effective tool in helping supply chain members achieve these goals.

From its business plan, each supply chain member provides certain observable data and assumptions to an enterprise model. The enterprise model includes the concept of economic models as well as process, placement, assortment, pricing, manufacturing, distribution, scheduling, inventory, optimization, supply, demand, and other decision-based modeling. The model performs a series of complex calculations and mathematical operations to predict and forecast the business functions in which the user is most interested. For example, retailer 16 may run price optimizations for various promotional items based on its demand models and product data collected at the point of sale. Likewise, manufacturer 12 and distributor 14 can run optimizations on product decisions in support of retailer 16. Manufacturer 12, distributor 14, and retailer 16 each generate forecasts and predictions, usually in graphic form to aid in understanding their individual impact as well as effects on other members to the supply chain. The output of the model is a report, graph, chart, table, or other analysis, which represents the model's forecasts and predictions based on the model parameters and the given set of data and assumptions. The forecast allows each supply chain member to make operational decisions.

As noted in the background, prior economic modeling systems utilize different or customized models for each level of the supply chain. It is desirable to standardize the models used by members of supply chain 10 to achieve more correlated analysis and collaborative planning. Accordingly, service provider 20 creates a supply chain communication platform with standardized models for each member of supply chain 10. Service provider 20 operates as an independent, third-party service provider, with expertise in statistical analysis. Service provider 20 offers access to shared data through the supply chain communication platform and subscriptions for the standardized models to manufacturer 12, distributor 14, and retailer 16. The supply chain communication platform gives the supply chain members the ability to share data in a controlled manner. The supply chain members can share only the relevant data for the particular product plan under evaluation without exposing other data that is not relevant to the subject product plan. The standardized models give the supply chain members the opportunity to analyze shared data taking into account content and orientation from each party, understand forecasts, and optimize product decisions. The supply and demand alignment capabilities through standardized planning models and tools facilitate collaborative retailer-supplier planning and fact-based contract negotiations, i.e., the parties will have a common set of relevant data and standardized models to generate correlated forecasts and reach agreement as to optimal product plans. The standardized models also allow the members to share and coordinate model scenarios electronically. Finally, the data sharing procedure and standardized models improve decision making by centralizing and standardizing processes, synchronizing data, and distributing the cost of model development among many supply chain members.

The supply chain communication platform provided by service provider 20 also creates demand-sensing capabilities through advanced demand modeling, better management and access to granular supply and demand data. The demand shaping and strategic management capabilities of the standardized model platform are made available through mathematical optimization of price, place, promotion and product, all to improve response to changing market conditions. The supply chain communication platform also provides a process identifying, prioritizing, and improving source data issues, which results in higher quality data, more automated processes, improved forecast accuracy with a bottom line result of improved service levels, sales, and profits. In the end, the data sharing process and standardized models provides clear view of the consumer, helping retailers and suppliers alike understand and better serve the end-customers.

The models are standardized in the sense that all members of the supply chain execute the same model for a given scenario. One or more standardized models can be used, depending on the product decision to be evaluated. In one embodiment, the standardized model is a demand model with coefficients or multipliers applied to non-linear functions that, through analysis of the shared data, quantify price elasticity, promotional lift, seasonality, product life cycle and cannibalization for the segment and product of interest. The demand model enables the planning application to forecast the impacts due to changes in price, promotion, and assortment. One demand model is disclosed in U.S. patent application Ser. No. 10/862,106, entitled "System and Method for Modeling Customer Response using Data Observable from Customer Buying Decisions", which is hereby incorporated by reference. Another demand model is disclosed in U.S. patent application Ser. No. 11/064,874, entitled "System and Method for Modeling Non-Stationary Time Series using a Non-Parametric Demand Profile", which is hereby incorporated by reference. Yet another demand model which simultaneously resolves multiple product decisions is disclosed in U.S. patent application Ser. No. 11/468,266, entitled, "System and Method of Modeling and Optimizing Product Parameters from Hierarchical Structure", which is hereby incorporated by reference.

Figure 2:
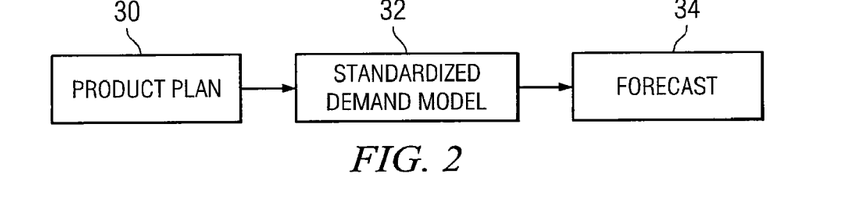
FIG. 2 illustrates a process for product planning, standardized modeling, and forecasting.

FIG. 2 illustrates an analysis scenario, which can be executed by each member of the supply chain. In block 30, a proposed product plan is formulated by a supply chain member to achieve a specific product-related goal, e.g., increases sales and profit. The product plan sets forth a set of data fields, including store, time period, price, promotion, assortment, cost of item, markdown, merchandising, inventory, shipment, and deal plans, which supports the criteria and rationale under which the plan will be executed. Deal plans include trade promotion plans, volume discounts, and scan-based incentives. The supply chain member formulates the product plan by identifying or quantifying each data field. The proposed product plan is then evaluated through the standardized demand model 32 to generate forecast 34. As described above, standardized demand model 32 analyzes the data to predict price elasticity, promotional lift, seasonality, product life cycle and cannibalization under the product plan. Forecast 34 is presented in a report format to project demand based on the proposed product plan.

As a feature of the present invention, the planning model operates separate from the forecast. In the prior art, the market participants tended to share only forecasts. Yet, simply sharing forecasts is not conducive to collaborative planning. For example, if retailer 16 simply shared its forecast with manufacturer 12, the manufacturer would not have the benefit and flexibility of trying different pricing and merchandising scenarios to look for a plan that will improve sales and profitability for both parties. In order for the manufacturer to run alternate scenarios, it needs the planning model and associated data from retailer 16. Accordingly, the present system shares the planning model and data independent of the forecast. If manufacturer 16 wants to try a different scenario where they drop the price of one product versus another product, and share the plan with retailer 16, the manufacturer can just share the new price plan and not all the underlying data. By sharing the planning scenario independent of the sales data, the system becomes more scalable.

The product plan and forecast can be forwarded to other supply chain members for consideration. Again, each member is using the same standardized model. Each member is operating with shared data applicable to the standardized model in order to evaluate the product plan under the same criteria, i.e., all supply chain members can perform independent evaluation of the proposed product plan and corresponding model-generated forecast. The member receiving the product plan can evaluate, accept, or modify the plan for further consideration by the originating member. Hence, the supply chain members can make proposals, evaluate "what-if" scenarios, offer alternatives, and reach consensus, all using the same shared data and standardized models so that each member can see how the product plan affects them, as well as the other members of the supply chain in terms of sales and profits. All members can see the win-win opportunities.

Consider an example where manufacturer 12 has excess inventory of product P and formulates a plan using its data that includes a temporary price reduction for that product. The plan further includes expansion of highly visible displays of the product in the store. Manufacturer 12 formulates the plan 30 for product P and executes demand model 32 to generate forecast 34. The underlying data and plan, and forecast as generated by demand model 32, are forwarded to retailer 16 for evaluation and consideration. Retailer 16 is interested in the plan, but makes a modification to reduce the expanded display area and further reduces the price for product P. Retailer 16 re-executes demand model 32 with the shared data, generates an alternate forecast 34, and returns the analysis with any relevant retailer data to manufacturer 12. Again, since manufacturer 12 and retailer 16 are using the same data, plan and standardized demand model, each is able to independently generate and evaluate forecasts that correlate to the other's analysis. If manufacturer 12 accepts the revised product plan from retailer 16, then distributor 14 is notified to get their buy-in the same manner described above and then implement the new product plan within the supply chain.

The standardized model platform advances planning applications between supply chain members as all require demand models to simulate, forecast, and optimize. Manufacturer 12 advanced planning applications include business intelligence, account/category management, retail advanced planning with a supplier perspective, trade promotion optimization, market mix optimization, and forecasting and replenishment. Retailer 16 advanced planning applications include business intelligence, price optimization, promotional optimization, markdown optimization, assortment and space optimization, forecasting and replenishment. The financial performance forecast accuracy and level of automation of advanced planning applications are dependent on the quality of the shared data and standardized demand model. Accordingly, a key capability of the standardized model platform is to provide a single, high quality demand model based on shared data that can support multiple applications each requiring different levels of aggregation, planning horizons, and time resolution. The benefit eliminates the need to duplicate the data, process to manage the shared data, processes to build and evaluate demand models, and reconcile inconsistent forecasts.

Figure 3:
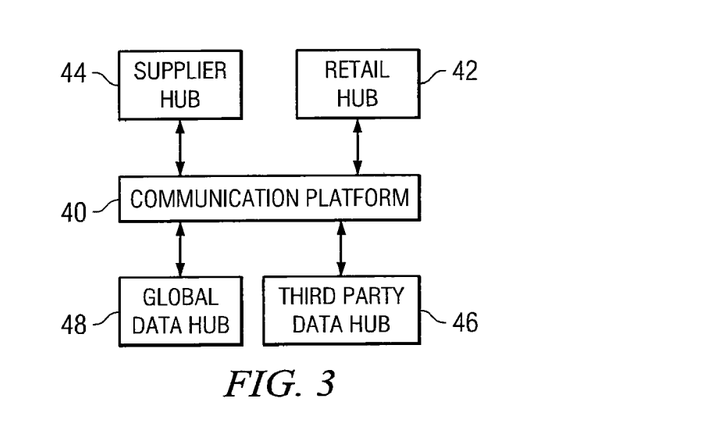
FIG. 3 illustrates a supply chain communication platform for exchange of data between supply chain members.

Turning to FIG. 3, a central supply chain communication platform 40 is shown with a plurality of client-member dedicated hubs 42-48 for sharing and exchange of data, product plans, and forecasts. The plurality of hubs is electronically linked through central platform 40 for communication and data transfer between the hubs. Platform 40 operates as a data exchange control service. Each trading partner has its own private hub with sole control over the data exchange. The trading partner decides who can access the data, what data is accessible, level of aggregation, products, geographies, etc. The platform-hub configuration allows each hub owner to control access and sharing of its data through communication platform 40. The originating member can share only the data necessary to evaluate the subject product plan without exposing data that is not relevant to the plan. The shared data include product plans and standardized demand models. The hubs may be located within the user's space or remotely located. Platform 40 manages synchronization of data from source-to-hub, hub-to-hub, and hub-to-client communication.

Retail hub 42 is a private hub controlled by retailer 16 and can be hosted or deployed behind the retailer's firewall. Retail hub 42 gives retailer 16 the ability to control access and sharing of its data. For example, retailer 16 can limit its data to certain supply chain members, regions, or specific product attributes. The retailer can share only the data necessary to evaluate the subject product plan without exposing data that is not relevant to the plan. Retail hub 42 stores the retailers demand content, such as supplier shipments, syndicated data, transaction log (TLOG) sales history, merchandising and marketing calendars, customer, store and product segments and hierarchies, demand models, and associated master data. Data is updated in real-time or periodically, e.g., daily. Retail hub 42 also manages integrating and aligning multiple vendor and third-party data sources. Retailer 16 controls each supplier's access to the demand content, i.e., type of demand content, market and product segments, and level of aggregation. Retail hub 42 manages the distribution of demand content to potentially thousands of suppliers and multiple third-party vendors. Retail hub 42 also supports modeling services and ad-hoc queries from the retailer and remains scalable for tier 1 retailers. Scalability makes the hub significantly more responsive.

Supplier hub 44 is a private hub controlled by the supplier and can be hosted or deployed behind the supplier's firewall. Again, the term "supplier" is applicable to manufacturer 12 and/or distributor 14 depending on the frame of reference. Supplier hub 44 gives the supplier the ability to control access and sharing of its data. The supplier can share only the data necessary to evaluate the subject product plan without exposing data that is not relevant to the plan. For example, the supplier can limit its data to certain supply chain members, regions, or specific product attributes. Supplier hub 44 integrates and aligns multiple data sources provided by multiple retailer and third-party data sources. Supplier hub 44 also manages the distribution of data to other supply chain members and third-party vendors. Supplier hub 44 stores the suppliers demand content, such as shipments, syndicated data, sales history from retail accounts, merchandising and marketing calendars, customer, store and product segments and hierarchies, demand models, and associated master data. Data is updated in real-time or periodically, e.g., daily. The supplier controls each member's access to the demand content, i.e., type of demand content, market and product segments, and level of aggregation. Supplier hub 44 supports modeling services and ad-hoc queries from the supplier and must be scalable for tier 1 suppliers. Scalability makes the hub significantly more responsive. Supplier hub 44 can provide baselines and coefficients for promotional analysis.

Third-party data hub 46 manages the integration, alignment and distribution of multiple third-party data sources. Third-party data sources help provide a complete picture of the market. Data sources include International Research Institute, Remote Data Service, CPI Data Services, Marks Coupon, ACN, Gladson, Acxiom, Planalytics, Trade Dimension, Google, Microsoft, Census Track, Tivo, and Microsoft Media Center. Each data source has its own update and distribution frequency depending on the third-party data source and client hub requirements. Third-party data sources can be simply passed through or aligned. Aligned data sources require a mapping to a common customer, location, time, and require quality control procedures to ensure accuracy and reliability of data as well as consistency with other data. Alignment of third-party data sources within the hub centralizes the process and eliminates the need to perform alignment in each client-member hub.

Global data hub 48 manages the integration, alignment and distribution of multiple global data providers, e.g., Agentrics and 1Sync. Each data source has its own update and distribution frequency depending on the third-party data source and client hub requirements. Global data sources can be simply passed through or aligned. Aligned data sources require a mapping to a common customer, location, time and require quality control procedures to ensure accuracy and reliability of data as well as consistency with other data. Alignment of global data sources within the hub centralizes the process and eliminates the need to perform alignment in each client-member hub.

The planning models can be created by the third party provider, or at each hub or a combination of the two. The third party provider has the advantage of providing a standard planning model. However, a retailer or supplier may have proprietary data they want to include in a non-standard proprietary model that they could use instead of or in addition to the standard model.

Consider an example where retailer 16 wants to share a product plan with manufacturer 12. Retailer 16 formulates the plan, executes the standardized model, and generates the forecast, as described in FIG. 2. The retailer's plan can also access data from third-party data hub 46 and global data hub 48 in formulating the plan. Retailer 16 also identifies the data relevant to the proposed plan that must be shared with manufacturer 12, including any data from third-party data hub 46 and global data hub 48. Retail hub 42 forwards the proposal (plan, standardize model, forecast, and relevant shared data) through supply chain communication platform 40 to supplier hub 44 associated with manufacturer 12. Communication platform 40 controls the exchange of the shared data with the designed recipient member hub. Supplier hub 44 receives the proposal from retail hub 42, including data from third-party data hub 46 and global data hub 48. Manufacturer 12 performs its own analysis and generates a reply proposal, either as an approval of the original proposal or a modified version thereof. Supplier hub 44 identifies the components of the approved or modified proposal that manufacturer 12 finds relevant and necessary to share with retail hub 42. The reply proposal is sent through supply chain communication platform 40 to retail hub 42. Communication platform 40 controls the exchange of the shared data with the designed recipient member hub, i.e., retailer 16 in this case. Retail hub 42 receives the approved or modified proposal from supplier hub 44 and can act upon the received proposal according to its business plan.

Standardized demand modeling services are provided for each hub. Demand models are used by advanced planning applications hosted by the client and are generated from points-of-sale data coupled with marketing, merchandising and promotional data. Demand models support multiple retail advanced planning applications, i.e., price, promotion, markdown, zone, assortment and space optimization, as well as forecasting and replenishment. Demand models support multiple supplier advanced planning applications such as trade promotion management, brand management, account management, category management, direct store delivery, and forecasting and replenishment. Demand models consist of coefficients that quantify each product's price elasticity, promotional lift, seasonality, product life cycle and cannibalization for the segment of interest. Used in planning applications, demand models enable the planning application to forecast the impacts due to changes in price, promotion and assortment. At the lowest level, demand models are built at the SKU-store-customer segment level and can be built at any aggregation of stores and customer segments. Model quality, in terms of forecast and parameter accuracy, is important to provide an automated, scalable solution that does not sacrifice model quality. Demand models can be scheduled at frequencies determined by the client. Each category can be modeled at a different frequency. Once approved, demand models are posed to the client's advanced planning applications.

Supply chain communication platform 40 provides a number of data management and analysis services for each client-member hub. Platform 40 offers master data management (MDM) services, which are available for each hub. Master data relates to general descriptions and attributes, as distinguished from transaction data, in a plurality of dimensions. In the product dimension, master data relates to product descriptions and attributes. In the store dimension of the master data describes stores, locations, and attributes of each store. Centralizing MDM provides the ability to delegate responsibility between retailer and supplier. For example, each manufacturer can be responsible for MDM of their products, while the retailer is responsible for MDM of their stores. Manufacturer 12 adds its attributes to the master data, distributor 14 adds its attributes to the master data, and retailer 16 adds its attributes to the master data. Suppliers control MDM for their products, such as universal product code (UPC), electronic product code (EPC), description, product attributes, price families and product lines, accessory items, and model after product. Retailer-designated category captains define demand groups, groups of substitutable items, and affinity items. Retailer 16 controls MDM for its private label (PL) products including PL-to-brand relationships. Retailer 16 also controls MDM for its stores, store hierarchies, merchandising hierarchies, and customer segments. Deploying MDM between the supply chain members eliminates redundancy and ensures consistent reliable data throughout the retailer's demand chain. MDM provides reports for incomplete or inconsistent master data, alerting both the retailer and supplier, and further provides user interface and algorithms to recommend and manage product relationships.

Platform 40 also offers transaction data management (TDM) services each client-member hub to ensure consistent and reliable transaction data. Data validation checks for holes in the data, validates master data, ensures data is consistent and within tolerances. Alerts are provided for questionable data. Quality control procedures are run before and after data alignment. Mathematical models are used to infer product introduction, discontinuation and out-of-stock events and promotional compliance.

Platform 40 provides data translation services between the suppliers and retailer. The translator provides different views of the data, supporting both retailer and supplier perspectives. The translator eliminates mismatches in reporting forecasts from the various supplier or retailer perspectives.

Platform 40 provides data brokering services to buy and sell data between supply chain members. The brokering service allows members to sell data to selected parties. Each client-member hub provides the ability for the client to price its demand content by type, segment, level of aggregation, and update frequency for each purchasing segment.

Platform 40 offers data aggregation services of the transaction data. When it comes to advanced planning, analyzing, modeling and forecasting, aggregation is more than summing the sales. For example, during a product introduction, different stores will start selling the product at different times. Some stores will run out-of-stock or change pricing under a promotion. Some promotions run only a couple of days during the week, others are only available to frequent shoppers. In any case, without tracking the fraction of stores that could sell the product at any given time, the aggregate sales can bias the models to incorrectly skew the forecasts. To compensate, the aggregation services factors in these product variations between stores on a fractional basis. Aggregation services start with TLOG sales data, reconcile the promotional calendar and then aggregate, tracking the fraction of customers, time, and stores that had access to a particular offer. Consider an example that for two days of the week a product is on promotion at a reduced price. For the remainder of the week, the price is the higher regular price and less product is sold. The aggregation must account for the fractional time that the product is offered at each price ($2/7$ at lower price and $5/7$ at higher price) to get an accurate demand. The data is stored as separate records, one for each fractional component. By accounting for fractional intra-store product variation in the aggregation process, a clear demand signal and accurate demand models can be realized. The aggregation services thus removes error from the forecasts to be shared between suppliers and retailers.

Platform 40 offers segmentation services for each client-member hub, which uses the demand models along with clustering algorithms to determine price zones, assortment zones, and customer segments. Providing the customer segmentation within the retailer's demand chain ensures that all members of the supply chain have a common view of the customer and are focused on the same objectives.

Platform 40 provides collaborative planning services streamline the planning process focusing on clear quantitative retailer and supplier objectives supported by common forecast and planning model. Collaborative planning services provide a synchronized promotional and merchandising calendar including the supplier's consumer promotions and events as well as the retailer's, synchronizes sales forecasts, and provides alternative planning scenarios that can be proposed and shared by either the supplier or the retailer.

Figure 4:
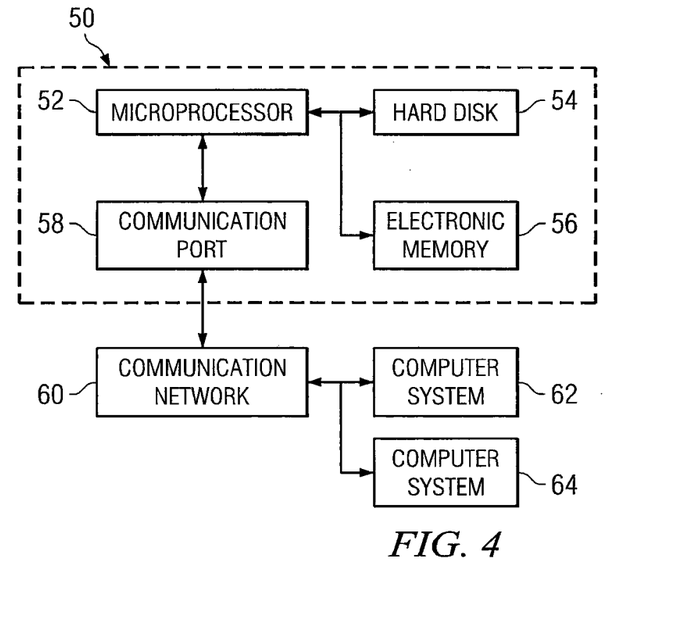
FIG. 4 is a computer system for executing the supply chain communication platform which controls exchange of data for use with standardized models.

FIG. 4 illustrates a simplified computer system 50 for executing the software program used in the supply chain communication platform and standardized modeling tools. Computer system 50 is a general-purpose computer including a central processing unit or microprocessor 52, mass storage device or hard disk 54, electronic memory 56, and communication port 58. Communication port 58 represents a modem, high-speed Ethernet link, or other electronic connection to transmit and receive input/output (I/O) data with respect to other computer systems.

Computer 50 is shown connected to communication network 60 by way of communication port 58. Communication network 60 can be a local and secure communication network such as an Ethernet network, global secure network, or open architecture such as the Internet. Computer systems 62 and 64 can be configured as shown for computer 50 or dedicated and secure data terminals. Computers 62 and 64 are also connected to communication network 60. Computers 50, 62, and 64 transmit and receive information and data over communication network 60.

When used as a standalone unit, computer 50 can be located in any convenient location. When used as part of a computer network, computers 50, 62, and 64 can be physically located in any location with access to a modem or communication link to network 60. For example, computer 50 can be located in the main office of retailer 16. Computer 62 can be located with manufacturer 12 or distributor 14. Computer 64 can be located with service provider 20. Alternatively, the computers can be mobile and accompany the users to any convenient location, e.g., remote offices, customer locations, hotel rooms, residences, vehicles, public places, or other locales with electronic access to communication network 60.

Each of the computers runs application software and computer programs, which can be used to display user-interface screens, execute the functionality, and provide the features of the aforedescribed supply chain communication platform and standardized modeling tools. In one embodiment, the screens and functionality come from the application software, i.e., the system runs directly on one of the computer systems. Alternatively, the screens and functionality can be provided remotely from one or more websites on the Internet. The websites are generally restricted-access and require passwords or other authorization for accessibility. Communications through such websites may be encrypted using secure encryption algorithms. Alternatively, the screens and functionality are accessible only on the secure private network, such as Virtual Private Network (VPN), with proper authorization.

The software is originally provided on computer-readable media, such as compact disks (CDs), magnetic tape, or other mass storage medium. Alternatively, the software is downloaded from electronic links such as the host or vendor website. The software is installed onto the computer system hard drive 54 and/or electronic memory 56, and is accessed and controlled by the computer's operating system. Software updates are also electronically available on mass storage media or downloadable from the host or vendor website. The software, as provided on the computer-readable media or downloaded from electronic links, represents a computer program product usable with a programmable computer processor having a computer-readable program code embodied within the computer program product. The software contains one or more programming modules, subroutines, computer links, and compilations of executable code, which perform the functions of the supply chain communication platform and standardized modeling tools. The user interacts with the software via keyboard, mouse, voice recognition, and other user-interface devices connected to the computer system.

The software stores information and data related to the supply chain communication platform and standardized modeling tools in a database or file structure located on any one of, or combination of, hard drives 54 of the computers 50, 62, and/or 64. More generally, the information can be stored on any mass storage device accessible to computers 50, 62, and/or 64. The mass storage device may be part of a distributed computer system.

In the case of Internet-based websites, the interface screens are implemented as one or more webpages for receiving, viewing, and transmitting information related to the supply chain communication platform and standardized modeling tools. A host service provider may set up and administer the website from computer 50 located in the service provider's home office. The employee accesses the webpages from computers 62 and 64 via communication network 50.

Figure 5:
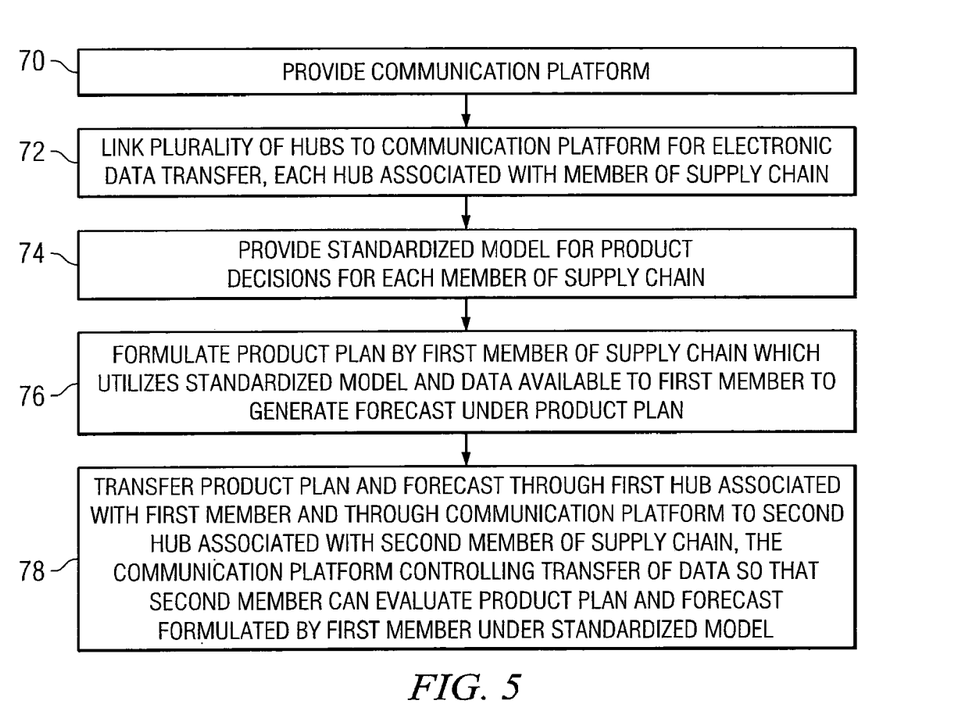
FIG. 5 illustrates the steps of providing the supply chain communication platform that controls exchange of data for use with standardized models.

As further explanation, FIG. 5 illustrates a process flowchart of one embodiment of the supply chain communication platform. Step 70 provides a communication platform. In step 72, a plurality of hubs is linked to the communication platform for electronic data transfer. The hubs are associated with the members of the supply chain. In addition, a hub associated with a third-party data source to the communication platform, and a hub associated with a global data source to the communication platform. In step 74, a standardized model for product decisions is provided for each member of the supply chain. The standardized model is a demand model including a plurality of coefficients applied to non-linear functions. In step 76, a product plan is formulated by a first member of the supply chain. The product plan utilizes the standardized model and data available to the first member to generate a forecast under the product plan. In step 78, the product plan with shared data and forecast is transferred through a first hub associated with the first member and through the communication platform to a second hub associated with a second member of the supply chain. The communication platform controls transfer of data so that the second member can evaluate the product plan and forecast formulated by the first member under the standardized model. The communication platform further providing master data management services for each hub, which controls exchange of master data in a plurality of dimensions, data brokering services to buy and sell data between the members of the supply chain, and data aggregation services of transaction data for the members of the supply chain.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method of facilitating interaction between members of a supply chain, comprising:
providing, by a computer system that includes a processing unit, a communication platform offering access to standardized models and supply chain data including shared data, data management, data translation, data brokering, data aggregation, data segmentation, and collaborative planning;
linking a plurality of private hubs to the communication platform for electronic data transfer, each private hub being deployed within a firewall associated with a member of the supply chain, each private hub being controlled by the member of the supply chain associated with the private hub and assessable by other members of the supply chain as authorized by the member of the supply chain associated with the private hub;
providing, by the computer system, a standardized model for product decisions for each member at each level of the supply chain, the product decisions including changing product placement, assortment, space, price, promotion, inventory, manufacturing, or transportation;
aligning the standardized model by mapping to a common customer, location, and time, so that content and orientation of supply chain data among each member at each level of the supply chain executes the same standardized model for the product decisions;
formulating a product plan by a business that is a first member of the supply chain, the product plan utilizing the standardized model and supply chain data available to the first member to generate a forecast under the product plan;
transferring the product plan with the standardized model, supply chain data, and forecast through a first private hub associated with and controlled by the first member and through the communication platform to a second private hub associated with and controlled by a business that is a second member of the supply chain and different from the business that is the first member of the supply chain so that the second member can evaluate each of the product plan, supply chain data, and forecast formulated under the standardized model independently, as formulated by the first member, within the second private hub; and
approving, using the computer system, the product plan or formulating a revised product plan by the business that is the second member of the supply chain and different from the business that is the first member of the supply chain, the revised product plan utilizing the standardized model and supply chain data available to the second member to generate a revised forecast under the revised product plan;
wherein the product plan includes a product decision that is controlled by the business that is the first member of the supply chain; and
wherein the approving the product plan or formulating a revised product plan by the business that is the second member of the supply chain and different from the business that is the first member of the supply chain comprises:
formulating, by the business that is the second member of the supply chain and different from the business that is the first member of the supply chain, a revised plan that: (i) includes a proposed change to the product decision that is controlled by the business that is the first member of the supply chain and (ii) requires approval by the business that is the first member of the supply chain after formulation of the revised plan that includes the proposed change to the product decision that is controlled by the business that is the first member of the supply chain;
wherein the product plan further includes a product decision that is controlled by the business that is the second member of the supply chain;
the method further comprising:
formulating, by the business that is the first member of the supply chain and different from the business that is the second member of the supply chain, a revision to the revised plan that: (i) includes a proposed change to the product decision that is controlled by the business that is the second member of the supply chain and (ii) requires approval by the business that is the second member of the supply chain after formulation of the revised plan that includes the proposed change to the product decision that is controlled by the business that is the second member of the supply chain;

wherein the business that is the first member of the supply chain is a retailer;

wherein the business that is the second member of the supply chain and different than the business that is the first member of the supply chain is a manufacturer;

wherein the product decision that is controlled by the first member of the supply chain and a change to which is proposed by the business that is the second member of the supply chain comprises: expansion of a visible display of a product in a store operated by the retailer that is the first member of the supply chain and different than the manufacturer that is the second member of the supply chain, and wherein the product plan's product decision that is controlled by the second member of the supply chain and a change to which is proposed by the business that is the first member of the supply chain comprises: a price for the product.

2. The computer-implemented method of claim 1, further including:

linking a private hub associated with a third-party data source to the communication platform; and linking a private hub associated with a global data source to the communication platform.

3. The computer-implemented method of claim 1, wherein the standardized model is a demand model including a plurality of coefficients applied to non-linear functions.

4. The computer-implemented method of claim 1, further including providing master data management services for each private hub which controls exchange of master data in a plurality of dimensions.

5. The computer-implemented method of claim 1, further including providing data brokering services to buy and sell data between the members at different levels of the supply chain.

6. The computer-implemented method of claim 1, further including providing data aggregation services of transaction data for the members at different levels of the supply chain.

7. A computer-implemented method of facilitating communication between members of a supply chain, comprising:

providing, by a computer system that includes a processing unit, a communication platform;

linking a plurality of private hubs to the communication platform for electronic data transfer, each private hub being deployed within a firewall associated with a member of the supply chain, each private hub being controlled by the member of the supply chain associated with the private hub and assessable by other members of the supply chain as authorized by the member of the supply chain associated with the private hub;

providing, by the computer system, a standardized model for product decisions for each member at each level of the supply chain, the product decisions including changing product placement, assortment, space, price, promotion, inventory; manufacturing, or transportation;

formulating a product plan and forecast by a business that is a first member of the supply chain, the product plan utilizing the standardized model and data available to the first member to generate a forecast under the product plan;

transferring the product plan with the standardized model, data, and forecast through a first private hub associated with and controlled by the first member and through the communication platform to a second private hub associated with and controlled by a business that is a second member of the supply chain and different from the business that is the first member of the supply chain so that the second member can evaluate each of the product plan, data, and forecast formulated under the standardized model independently, as formulated by the first member, within the second private hub; and approving, using the computer system, the product plan or formulating a revised product plan by the business that is the second member of the supply chain and different from the business that is the first member of the supply chain, the revised product plan utilizing the standardized model and data available to the second member to generate a revised forecast under the revised product plan;

wherein the product plan includes a product decision that is controlled by the business that is the first member of the supply chain; and wherein the approving the product plan or formulating a revised product plan by the business that is the second member of the supply chain and different from the business that is the first member of the supply chain comprises:

formulating, by the business that is the second member of the supply chain and different from the business that is the first member of the supply chain, a revised plan that: (i) includes a proposed change to the product decision that is controlled by the business that is the first member of the supply chain and (ii) requires approval by the business that is the first member of the supply chain after formulation of the revised plan that includes the proposed change to the product decision that is controlled by the business that is the first member of the supply chain;

wherein the product plan further includes a product decision that is controlled by the business that is the second member of the supply chain;

the method further comprising:

formulating, by the business that is the first member of the supply chain and different from the business that is the second member of the supply chain, a revision to the revised plan that: (i) includes a proposed change to the product decision that is controlled by the business that is the second member of the supply chain and (ii) requires approval by the business that is the second member of the supply chain after formulation of the revised plan that includes the proposed change to the product decision that is controlled by the business that is the second member of the supply chain;

wherein the business that is the first member of the supply chain is a retailer;

wherein the business that is the second member of the supply chain and different than the business that is the first member of the supply chain is a manufacturer;

wherein the product decision that is controlled by the first member of the supply chain and a change to which is proposed by the business that is the second member of the supply chain comprises: expansion of a visible display of a product in a store operated by the retailer that is the first member of the supply chain and different than the manufacturer that is the second member of the supply chain, and wherein the product plan's product decision that is controlled by the second member of the supply chain and a change to which is proposed by the business that is the first member of the supply chain comprises: a price for the product.

8. The computer-implemented method of claim 7, further including:

linking a private hub associated with a third-party data source to the communication platform; and linking a private hub associated with a global data source to the communication platform.

9. The computer-implemented method of claim 7, further including providing master data management services for each private hub which controls exchange of master data in a plurality of dimensions.

10. The computer-implemented method of claim 7, further including providing data brokering services to buy and sell data between the members of the supply chain.

11. The computer-implemented method of claim 7, further including providing data aggregation services of transaction data for the members of the supply chain.

12. A computer program product, comprising computer readable program code embodied in a non-transitory computer usable medium, the computer readable program code adapted to implement a method of facilitating communication between members of a supply chain, comprising:
providing a communication platform;
linking a plurality of private hubs to the communication platform for electronic data transfer, each private hub being deployed within a firewall associated with a member of the supply chain, each private hub being controlled by the member of the supply chain associated with the private hub and assessable by other members of the supply chain as authorized by the member of the supply chain associated with the private hub;
providing a standardized model for product decisions for each member at each level of the supply chain, the product decisions including changing product placement, assortment, space, price, promotion, inventory, manufacturing, or transportation;
formulating a product plan by a business that is a first member of the supply chain, the product plan utilizing the standardized model and data available to the first member to generate a forecast under the product plan; and
transferring the product plan with the standardized model, data, and forecast through a first private hub associated with and controlled by the first member and through the communication platform to a second private hub associated with and controlled by a business that is a second member of the supply chain and different from the business that is the first member of the supply chain so that the second member can evaluate each of the product plan, data, and forecast formulated under the standardized model independently, as formulated by the first member, within the second private hub; and
wherein the product plan includes a product decision that is controlled by the business that is the first member of the supply chain;
the method further comprising:
formulating, by the business that is the second member of the supply chain and different from the business that is the first member of the supply chain, a revised plan that: (i) includes a proposed change to the product decision that is controlled by the business that is the first member of the supply chain and (ii) requires approval by the business that is the first member of the supply chain after formulation of the revised plan that includes the proposed change to the product decision that is controlled by the business that is the first member of the supply chain;
wherein the product plan further includes a product decision that is controlled by the business that is the second member of the supply chain;
the method further comprising:
formulating, by the business that is the first member of the supply chain and different from the business that is the second member of the supply chain, a revision to the revised plan that: (i) includes a proposed change to the product decision that is controlled by the business that is the second member of the supply chain and (ii) requires approval by the business that is the second member of the supply chain after formulation of the revised plan that includes the proposed change to the product decision that is controlled by the business that is the second member of the supply chain;
wherein the business that is the first member of the supply chain is a retailer;
wherein the business that is the second member of the supply chain and different than the business that is the first member of the supply chain is a manufacturer;
wherein the product decision that is controlled by the first member of the supply chain and a change to which is proposed by the business that is the second member of the supply chain comprises: expansion of a visible display of a product in a store operated by the retailer that is the first member of the supply chain and different than the manufacturer that is the second member of the supply chain, and
wherein the product plan's product decision that is controlled by the second member of the supply chain and a change to which is proposed by the business that is the first member of the supply chain comprises: a price for the product.

13. The computer program product of claim 12, the method further including:
linking a private hub associated with a third-party data source to the communication platform; and
linking a private hub associated with a global data source to the communication platform.

14. The computer program product of claim 12, the method further including providing master data management services for each private hub which controls exchange of master data in a plurality of dimensions.

15. The computer program product of claim 12, the method further including providing data brokering services to buy and sell data between the members of the supply chain.

16. A computer system for facilitating communication between members of a supply chain, comprising:
means for providing a communication platform offering access to standardized models and supply chain data including shared data, data management, data translation, data brokering, data aggregation, data segmentation, and collaborative planning;
means for linking a plurality of private hubs to the communication platform for electronic data transfer, each private hub being deployed within a firewall associated with a member of the supply chain, each private hub being controlled by the member of the supply chain associated with the private hub and assessable by other members of the supply chain as authorized by the member of the supply chain associated with the private hub;
means for providing a standardized model for product decisions for each member of the supply chain, the product decisions including changing product placement, assortment, space, price, promotion, inventory, manufacturing, or transportation;
means for aligning the standardized model by mapping to a common customer, location, and time, so that content and orientation of supply chain data among each member of the supply chain executes the same standardized model for the product decisions;

means for formulating a product plan by a business that is a first member of the supply chain, the product plan utilizing the standardized model and supply chain data available to the first member to generate a forecast under the product plan;

means for transferring the product plan with the standardized model, supply chain data, and forecast through a first private hub associated with and controlled by the first member and through the communication platform to a second private hub associated with and controlled by a business that is a second member of the supply chain and different from the business that is the first member of the supply chain so that the second member can evaluate each of the product plan supply chain data, and forecast formulated under the standardized model independently, as formulated by the first member, within the second private hub; and means for approving the product plan or formulating a revised product plan by the business that is the second member of the supply chain and different from the business that is the first member of the supply chain, the revised product plan utilizing the standardized model and supply chain data available to the second member to generate a revised forecast under the revised product plan;

wherein the product plan includes a product decision that is controlled by the business that is the first member of the supply chain; and wherein the means for approving the product plan or formulating a revised product plan by the business that is the second member of the supply chain and different from the business that is the first member of the supply chain comprises:

means for formulating, by the business that is the second member of the supply chain and different from the business that is the first member of the supply chain, a revised plan that: (i) includes a proposed change to the product decision that is controlled by the business that is the first member of the supply chain and (ii) requires approval by the business that is the first member of the supply chain after formulation of the revised plan that includes the proposed change to the product decision that is controlled by the business that is the first member of the supply chain;

wherein the product plan further includes a product decision that is controlled by the business that is the second member of the supply chain;

the system further comprising:

means for formulating, by the business that is the first member of the supply chain and different from the business that is the second member of the supply chain, a revision to the revised plan that: (i) includes a proposed change to the product decision that is controlled by the business that is the second member of the supply chain and (ii) requires approval by the business that is the second member of the supply chain after formulation of the revised plan that includes the proposed change to the product decision that is controlled by the business that is the second member of the supply chain;

wherein the business that is the first member of the supply chain is a retailer;

wherein the business that is the second member of the supply chain and different than the business that is the first member of the supply chain is a manufacturer;

wherein the product decision that is controlled by the first member of the supply chain and a change to which is proposed by the business that is the second member of the supply chain comprises: expansion of a visible display of a product in a store operated by the retailer that is the first member of the supply chain and different than the manufacturer that is the second member of the supply chain, and wherein the product plan's product decision that is controlled by the second member of the supply chain and a change to which is proposed by the business that is the first member of the supply chain comprises: a price for the product.

17. The computer system of claim 16, further including:
means for linking a private hub associated with a third-party data source to the communication platform; and
means for linking a private hub associated with a global data source to the communication platform.

18. The computer system of claim 16, further including means for providing data brokering services to buy and sell data between the members of the supply chain.

19. The computer-implemented method of claim 7, wherein the standardized model is a demand model including a plurality of coefficients applied to non-linear functions.

20. The computer program product of claim 12, further including providing data aggregation services of transaction data for the members of the supply chain.

21. The computer system of claim 16, further including means for providing master data management services for each private hub which controls exchange of master data in a plurality of dimensions.

22. The computer-implemented method of claim 1, wherein the second private hub identifies components of the approved product plan or revised product plan.

23. The computer-implemented method of claim 7, wherein the second private hub identifies components of the approved product plan or revised product plan.

24. The computer-implemented method of claim 1, further comprising:
sending the approved product plan or revised product plan through the communication platform to the first private hub; and
acting, by the first private hub, upon the approved product plan or the modified product plan according to a business plan of the first member of the supply chain.

25. The computer-implemented method of claim 7, further comprising:
sending the approved product plan or revised product plan through the communication platform to the first private hub; and
acting, by the first private hub, upon the approved product plan or the modified product plan according to a business plan of the first member of the supply chain.

26. The computer program product of claim 12, the method further comprising:
sending the approved product plan or revised product plan through the communication platform to the first private hub; and
acting, by the first private hub, upon the approved product plan or the modified product plan according to a business plan of the first member of the supply chain.

27. The computer system of claim 16, further comprising:
means for sending the approved product plan or revised product plan to the first private hub; and
means for acting upon the approved product plan or the modified product plan according to a business plan of the first member of the supply chain.

28. The computer-implemented method of claim 1, wherein the first private hub is deployed within a firewall associated with the business that is the first member of the supply chain; and wherein the second private hub is deployed within a firewall associated with the business that is the second member of the supply chain.

29. The computer-implemented method of claim 28, wherein the first private hub is deployed within a space of the business that is the first member of the supply chain; and wherein the second private hub is deployed within a space of the business that is the second member of the supply chain.

30. The computer-implemented method of claim 1, wherein the first private hub is deployed within a space of the business that is the first member of the supply chain; and wherein the second private hub is deployed within a space of the business that is the second member of the supply chain.

31. The computer-implemented method of claim 1,
wherein the formulating the revised plan, by the business that is the second member of the supply chain and different from the business that is the first member of the supply chain, further comprises changing the product plan's product decision that is controlled by the business that is the second member of the supply chain.

32. The computer-implemented method of claim 31,
wherein the formulating a revision to the revised plan, by the business that is the first member of the supply chain and different from the business that is the second member of the supply chain, further comprises changing the product plan's product decision that is controlled by the business that is the first member of the supply chain and different than the business that is the second member of the supply chain.

33. The computer-implemented method of claim 7,
wherein the formulating the revised plan, by the business that is the second member of the supply chain and different from the business that is the first member of the supply chain, further comprises changing the product plan's product decision that is controlled by the business that is the second member of the supply chain.

34. The computer-implemented method of claim 33,
wherein the formulating a revision to the revised plan, by the business that is the first member of the supply chain and different from the business that is the second member of the supply chain, further comprises changing the product plan's product decision that is controlled by the business that is the first member of the supply chain and different than the business that is the second member of the supply chain.

35. The computer program product of claim 12,
wherein the formulating the revised plan, by the business that is the second member of the supply chain and different from the business that is the first member of the supply chain, further comprises changing the product plan's product decision that is controlled by the business that is the second member of the supply chain.

36. The computer program product of claim 35,
wherein the formulating a revision to the revised plan, by the business that is the first member of the supply chain and different from the business that is the second member of the supply chain, further comprises changing the product plan's product decision that is controlled by the business that is the first member of the supply chain and different than the business that is the second member of the supply chain.

37. The computer system of claim 16,
wherein the means for formulating the revised plan, by the business that is the second member of the supply chain and different from the business that is the first member of the supply chain, further comprises means for changing the product plan's product decision that is controlled by the business that is the second member of the supply chain.

38. The computer system of claim 37,
wherein the formulating a revision to the revised plan, by the business that is the first member of the supply chain and different from the business that is the second member of the supply chain, further comprises changing the product plan's product decision that is controlled by the business that is the first member of the supply chain and different than the business that is the second member of the supply chain.

* * * * *